US011286009B2

(12) United States Patent
DeSimone

(10) Patent No.: US 11,286,009 B2
(45) Date of Patent: Mar. 29, 2022

(54) TAILGATE WITH INTEGRATED MODULAR LOADING RAMP

(71) Applicant: Steve DeSimone, Hilton Head, SC (US)

(72) Inventor: Steve DeSimone, Hilton Head, SC (US)

(*) Notice: Subject to any disclaimer, the term of this patent is extended or adjusted under 35 U.S.C. 154(b) by 87 days.

(21) Appl. No.: 16/819,707

(22) Filed: Mar. 16, 2020

(65) Prior Publication Data
US 2020/0324831 A1 Oct. 15, 2020

Related U.S. Application Data

(60) Provisional application No. 62/832,929, filed on Apr. 12, 2019.

(51) Int. Cl.
| | |
|---|---|
| *B60J 7/00* | (2006.01) |
| *B62D 33/03* | (2006.01) |
| *B62D 27/06* | (2006.01) |
| *B62D 29/00* | (2006.01) |
| *B60P 1/43* | (2006.01) |

(52) U.S. Cl.
CPC .............. *B62D 33/03* (2013.01); *B60P 1/435* (2013.01); *B62D 27/06* (2013.01); *B62D 29/008* (2013.01)

(58) Field of Classification Search
CPC .... B62D 33/0273; B62D 33/03; B62D 33/08; B60P 3/40; B60P 1/435; B60J 7/068
See application file for complete search history.

(56) References Cited

U.S. PATENT DOCUMENTS

| | | |
|---|---|---|
| 3,510,015 A | 5/1970 | Roshaven |
| 4,114,944 A | 9/1978 | Joynt et al. |
| 4,305,694 A | 12/1981 | Chan |
| 4,571,144 A | 2/1986 | Guidry |
| 4,596,417 A * | 6/1986 | Bennett .................. B60P 1/435 296/61 |
| 4,795,304 A | 1/1989 | Dudley |
| 4,884,838 A | 12/1989 | Slater |
| 4,923,350 A | 5/1990 | Beauchemin |
| 4,923,360 A | 5/1990 | Beauchemin |
| 5,273,335 A | 12/1993 | Belnap |
| 5,425,564 A | 6/1995 | Thayer |
| 5,468,038 A | 11/1995 | Sauri |
| 5,540,474 A | 7/1996 | Holland |
| 5,597,195 A | 1/1997 | Meek |
| 5,732,995 A | 3/1998 | Piccariello |

(Continued)

FOREIGN PATENT DOCUMENTS

| | | |
|---|---|---|
| CA | 2398799 C | 8/2001 |
| FR | 2243841 A1 | 4/1975 |

(Continued)

OTHER PUBLICATIONS

International Search Report dated May 28, 2020 for Application No. PCT/US 2020/022934.

*Primary Examiner* — Kiran B Patel
(74) *Attorney, Agent, or Firm* — The Dobrusin Law Firm, P.C.; Bryan S. Lemanski

(57) ABSTRACT

A tailgate system, comprising: (i) a tailgate door configured to pivotally engage a rear cargo area of a body of a vehicle in between a closed position and an open position; and (ii) a bed extension pivotally engaged to the tailgate door and configured to pivot from a closed position to one or more open positions, wherein the bed extension includes a plurality of removable panels.

18 Claims, 5 Drawing Sheets

(56) References Cited

U.S. PATENT DOCUMENTS

| | | | |
|---|---|---|---|
| 5,816,638 A * | 10/1998 | Pool, III | B62D 33/0273 296/26.11 |
| 5,826,932 A * | 10/1998 | DeSimone | B60P 3/40 296/57.1 |
| 5,857,724 A | 1/1999 | Jarman | |
| 5,941,588 A * | 8/1999 | Marconi | B62D 33/0273 296/26.11 |
| 6,120,076 A * | 9/2000 | Adsit | B60P 3/40 296/26.11 |
| 6,142,548 A * | 11/2000 | Kuhn | B60P 3/40 296/26.1 |
| 6,340,190 B1 * | 1/2002 | Rosebrugh | B60P 3/40 296/26.11 |
| 6,378,893 B1 * | 4/2002 | Jager | B62D 33/0207 280/401 |
| 6,378,926 B1 * | 4/2002 | Renze | B60P 3/40 296/183.1 |
| 6,378,927 B1 | 4/2002 | Parry-Jones | |
| 6,422,627 B1 * | 7/2002 | Kuhn | B60P 3/40 296/26.1 |
| 6,422,630 B1 * | 7/2002 | Heaviside | B62D 33/0273 296/26.11 |
| 6,454,338 B1 | 9/2002 | Glickman et al. | |
| 6,513,850 B1 * | 2/2003 | Reed | B62D 33/0273 296/26.08 |
| 6,575,516 B2 | 6/2003 | Webber | |
| 6,746,066 B2 * | 6/2004 | Reed | B62D 33/0273 296/26.08 |
| 6,749,246 B2 | 6/2004 | Landwehr | |
| 6,764,123 B1 | 7/2004 | Bilyard | |
| 6,834,903 B2 | 12/2004 | Harper | |
| 6,948,755 B1 * | 9/2005 | Bauer | B60P 1/435 296/37.6 |
| 6,991,277 B1 | 1/2006 | Esler | |
| 6,994,363 B2 | 2/2006 | Seksaria et al. | |
| 7,070,220 B1 * | 7/2006 | Lantaigne | B60P 1/435 14/69.5 |
| 7,111,885 B1 * | 9/2006 | Hoffmann | B62D 33/0273 296/26.11 |
| 7,204,537 B1 * | 4/2007 | Oh | B60P 3/077 296/26.09 |
| 7,258,384 B2 | 8/2007 | Drabik | |
| 7,309,202 B1 | 12/2007 | Anderson | |
| 7,344,184 B2 | 3/2008 | Salvador et al. | |
| 7,350,843 B2 | 4/2008 | Meyers et al. | |
| 7,354,090 B1 * | 4/2008 | Pomorski | B60N 2/005 296/26.11 |
| 7,524,156 B2 | 4/2009 | Garbes | |
| 7,533,923 B1 | 5/2009 | Caldwell | |
| 7,571,947 B2 * | 8/2009 | Hawley | B62D 33/0273 296/26.08 |
| 7,628,439 B1 | 12/2009 | Strong | |
| 7,677,626 B2 | 3/2010 | Hanzel | |
| 7,712,811 B2 | 5/2010 | Heaman et al. | |
| 7,771,154 B2 | 8/2010 | Ehler | |
| 8,075,038 B2 | 12/2011 | Zielinsky | |
| 8,109,552 B2 | 2/2012 | Nelson | |
| D674,162 S | 1/2013 | Gooch | |
| 8,827,343 B2 | 9/2014 | Peters | |
| 9,067,525 B1 | 6/2015 | Ninov | |
| 9,156,507 B1 * | 10/2015 | Reed | B62D 33/037 |
| 9,162,602 B2 | 10/2015 | Wendinger | |
| 9,346,390 B1 | 5/2016 | Croswhite | |
| 9,452,793 B1 * | 9/2016 | Quick | B62D 33/03 |
| 9,616,795 B1 | 4/2017 | Vick | |
| 9,738,204 B1 | 8/2017 | Stojkovic | |
| 9,789,913 B2 * | 10/2017 | Singer | B62D 33/08 |
| 9,845,041 B1 | 12/2017 | Courtland | |
| 9,878,652 B2 | 1/2018 | DeSimone | |
| 9,862,430 B1 | 6/2018 | Stojkovic et al. | |
| 10,124,837 B2 | 11/2018 | Reiners et al. | |
| 10,214,250 B2 | 2/2019 | Hemphill et al. | |
| 10,518,687 B2 | 12/2019 | DeSimone | |
| 2002/0031422 A1 | 3/2002 | Schilling | |
| 2002/0145300 A1 | 10/2002 | Webber | |
| 2002/0153737 A1 * | 10/2002 | Fitts | B60P 3/40 296/26.11 |
| 2002/0172584 A1 | 11/2002 | Huggins | |
| 2003/0015885 A1 | 1/2003 | Landwehr | |
| 2003/0071476 A1 | 4/2003 | Schilling | |
| 2003/0168874 A1 | 9/2003 | Bautista, Jr. | |
| 2004/0032142 A1 | 2/2004 | Sherrer | |
| 2006/0045703 A1 | 3/2006 | Dougherty | |
| 2006/0214449 A1 * | 9/2006 | Klusmeier | B62D 33/0273 296/26.11 |
| 2007/0182192 A1 | 8/2007 | Meyers | |
| 2007/0228761 A1 | 10/2007 | Dryja | |
| 2008/0034512 A1 | 2/2008 | Meyers | |
| 2008/0042464 A1 | 2/2008 | Hutchins, Jr | |
| 2008/0174138 A1 | 7/2008 | Huggins | |
| 2008/0231067 A1 | 9/2008 | Nagle | |
| 2008/0267729 A1 | 10/2008 | Barker | |
| 2008/0284194 A1 | 11/2008 | Bower | |
| 2009/0044729 A1 | 2/2009 | Navarre | |
| 2009/0102216 A1 | 4/2009 | Hanzel | |
| 2009/0108614 A1 | 4/2009 | Washington | |
| 2011/0057469 A1 | 3/2011 | Zielinsky | |
| 2011/0072596 A1 * | 3/2011 | Kenny | B60P 1/435 14/69.5 |
| 2011/0121602 A1 | 5/2011 | Zielinsky | |
| 2011/0163565 A1 | 7/2011 | Zielinsky | |
| 2011/0181068 A1 | 7/2011 | Zielinsky | |
| 2012/0139281 A1 | 6/2012 | Cousino | |
| 2013/0028693 A1 | 1/2013 | Justak | |
| 2013/0094930 A1 | 4/2013 | Kalergis | |
| 2013/0175820 A1 | 7/2013 | Lepage | |
| 2014/0182087 A1 | 7/2014 | St. Jean | |
| 2015/0225024 A1 * | 8/2015 | Newberry | B62D 33/0273 296/26.11 |
| 2016/0031353 A1 * | 2/2016 | DeSimone | B60P 1/435 296/57.1 |
| 2016/0144759 A1 | 5/2016 | DiBlasio | |
| 2017/0203799 A1 * | 7/2017 | Quick | B62D 33/0273 |
| 2017/0341560 A1 | 11/2017 | Stojkovic et al. | |
| 2018/0009487 A1 * | 1/2018 | Astrike | B60P 7/02 |
| 2018/0029515 A1 | 2/2018 | Raines et al. | |
| 2018/0056842 A1 | 3/2018 | Miranda Nieto | |
| 2018/0057076 A1 * | 3/2018 | Singer | B60R 19/38 |
| 2018/0257537 A1 * | 9/2018 | DeSimone | B60P 1/435 |
| 2019/0023331 A1 * | 1/2019 | Quick | B62D 33/03 |

FOREIGN PATENT DOCUMENTS

| | | |
|---|---|---|
| GB | 2563059 A | 12/2018 |
| RU | 2270116 C2 | 2/2006 |
| RU | 53985 U1 | 6/2006 |
| WO | 2016/028884 A1 | 2/2016 |
| WO | 2018/165361 | 9/2018 |

* cited by examiner

TAILGATE WITH INTEGRATED MODULAR LOADING RAMP

FIELD

The present teachings generally relate to a vehicle tailgate, and more particularly, to a customizable and adjustable vehicle tailgate.

BACKGROUND

Vehicles are frequently used to transport cargo between destinations. These vehicles may include a bed area to provide space for oversized items. As such, a vehicle bed may include a tailgate to open and close a rear segment of the bed for easier loading and unloading of cargo. However, the cargo being transported may be heavy, bulky, or otherwise difficult to load and unload from the vehicle, even with a tailgate. Attempts have been made to create devices that alleviate the difficulties loading and unloading cargo. For example, a tailgate may include an extension or support system that allows for larger items to be stored within the confines of the vehicle bed. However, the extension or support system may be bulky and difficult to operate. Furthermore, the extension or support system may be frequently be limited to a single mode of operation, thereby still being unable to adapt to different types of cargo.

In addition to tailgates frequently having difficulty with loading and unloading various types of cargo, tailgates doors may often provide no customization. For example, a tailgate door may simply open and close to allow for easier insertion of cargo, but may not provide a working surface, a means to secure the cargo once positioned within the vehicle bed, or both. Attempts have been made to provide a tailgate door that helps secure cargo within the vehicle bed. For example, the tailgate door may include one or more straps, hooks, or both to tie down the cargo. However, these straps, hooks, or both may be positioned in less than ideal locations along the tailgate and provide little to no flexibility when securing oversized cargo. Additionally, these tailgates may not allow for any customization or interchangeability with the hooks, straps, other accessories, or a combination thereof.

Examples of tailgates may be found in U.S. Pat. Nos. 9,878,652 and 10,518,687; and U.S. Patent Publication No. 2018/0257537, all of which are incorporated herein for all purposes. It would be attractive to have a tailgate that alleviates difficulties loading and unloading cargo from a tailgate bed. What is needed is a tailgate having an integrated loading ramp. It would be attractive to have a tailgate that aids in securing cargo within the tailgate bed. What is needed is a tailgate having interchangeable and customizable securing mechanisms to secure the cargo within the tailgate bed. It would be attractive to have a tailgate configured to support one or more oversized pieces of cargo. What is needed is a tailgate having a bed extension with one or more removable panels configured to secure the oversized cargo.

SUMMARY

The present teachings meet one or more of the present needs by providing a tailgate system, comprising: (i) a tailgate door configured to pivotally engage a rear cargo area of a body of a vehicle in between a closed position and an open position; and (ii) a bed extension pivotally engaged to the tailgate door and configured to pivot from a closed position to one or more open positions, wherein the bed extension includes a plurality of removable panels.

The present teachings meet one or more of the present needs by providing a bed extension configured to pivotally engage a tailgate door, the bed extension comprising: (i) one or more frame members that form an outer periphery of the bed extension; (ii) one or more crossmembers that extend between, or project from, the one or more frame members to form a plurality of cutouts; and (iii) a plurality of panels secured within the plurality of cutouts via one or more mounts positioned within the cutouts and secured to the one or more frame members, one or more crossmembers, or both.

The present teachings meet one or more of the present needs by providing a tailgate system, wherein: the bed extension includes one or more frame members that form an outer periphery of the bed extension, and one or more crossmembers extend between, or project from, the one or more frame members to form a plurality of cutouts configured to receive the plurality of panels; the plurality of panels are mounted to one or more mounts positioned within the cutouts, the mounts being secured to the one or more frame members, one or more crossmembers, or both; the bed extension is pivotally engaged to the tailgate door via one or more lug portions extending from the one or more frame members, one or more crossmembers, or both; the one or more open positions includes a semi-open position that forms an angle of about 180 degrees between the bed extension and an inner surface of the tailgate door; the one or more open positions includes a fully-open position that forms an angle of about 210 degrees between the bed extension and an inner surface of the tailgate door; the lug portions of the bed extension are received by notches of the tailgate door to extend to the fully-open position; the plurality of panels include a slot on a first surface and one or more channels on an opposing second surface; the plurality of panels are interchangeable; the plurality of panels include one or more flanges that abut the mounts of the bed extension so that one or more holes of the plurality of panels align with holes of the mounts so that one or more fasteners extend through the aligned holes to secure the plurality of panels to the bed extension; the plurality of panels are extruded aluminum; the bed extension includes one or more slots configured to secure one or more ramps, and the one or more ramps are stored within the confines of the tailgate door when not secured to the bed extension; the one or more ramps are secured to the bed extension in the fully-open position; when the bed extension is in the closed position, the bed extension abuts an inner surface of the tailgate door, and wherein the inner surface of the tailgate door includes one or more bores that allow a user to grasp the bed extension to move the bed extension to the one or more open positions; an area of the bed extension is less than an area of the tailgate door so that the bed extension is stored within the confines of the tailgate door in the closed position; the lug portions of the bed extension are received by bosses of the tailgate door, and the lug portions are pivotally engaged to the bosses via fasteners; the tailgate door further includes one or more blocks movably secured within a sleeve so that the blocks can be moved between an engaged position and a disengaged position, and when the blocks are in an engaged position, the lug portions of the bed extension rest on the blocks to maintain the bed extension in the semi-open position; or a combination thereof.

The present teachings meet one or more of the present needs by providing a tailgate system that alleviates difficulties loading and unloading cargo from a tailgate bed, includes an integrated loading ramp, aids in securing cargo within the tailgate bed, includes interchangeable and customizable tie down mechanisms to secure the cargo within the tailgate bed, or a combination thereof. The present teachings meet one or more of the present needs by providing a tailgate system configured to support one or more oversized pieces of cargo, that includes a bed extension with one or more removable panels configured to secure the oversized cargo, or a combination thereof.

DETAILED DESCRIPTION

Figure 1:
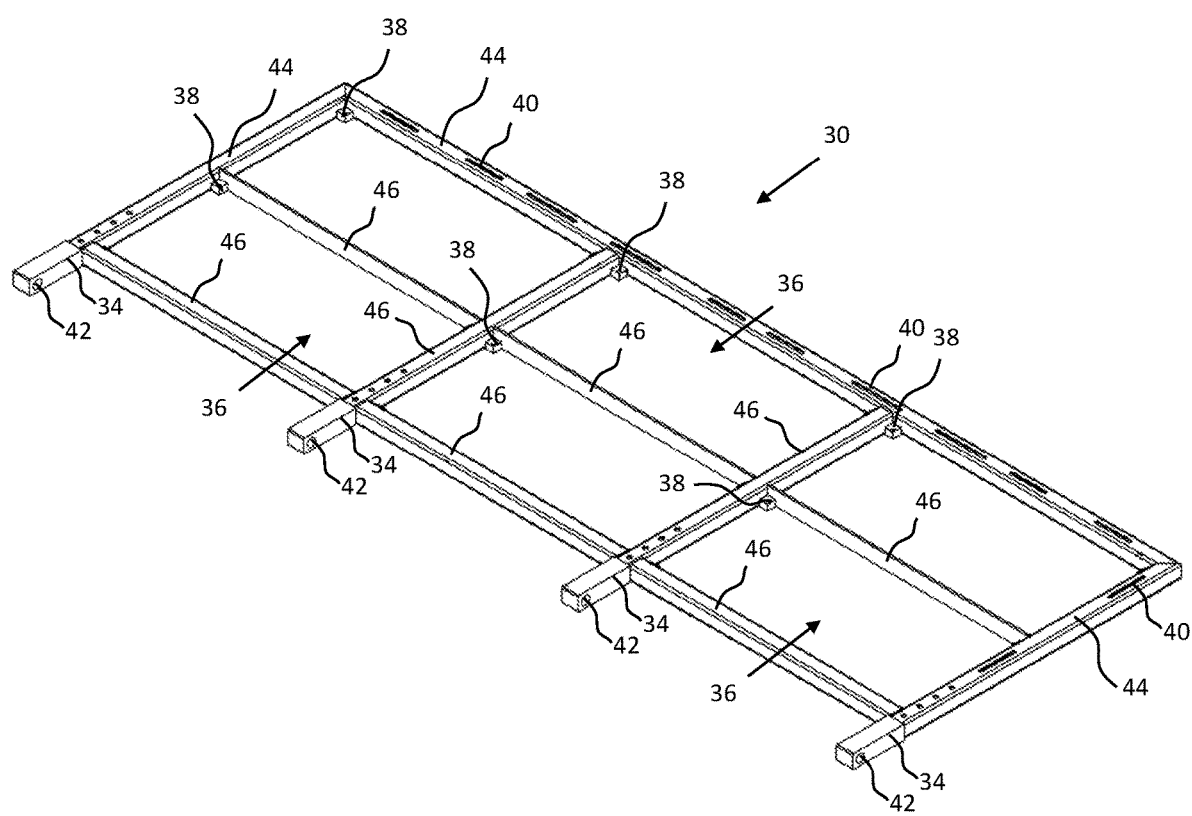
FIG. 1 is a perspective view of a bed extension free of panels.

This application is related to U.S. Pat. Nos. 9,878,652 and 10,518,687; and U.S. Patent Publication No. 2018/0257537, all of which are incorporated herein for all purposes.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a tailgate system. The tailgate system functions to provide users a quicker and easier way to load and unload cargo from a transportation vehicle, such as a pickup truck or other automotive vehicle including a storage bed. The tailgate system functions to provide additional workspace or loading space. The tailgate system functions to maintain multiple user-desired storage positions. Individual components may be removed, detached, added, connected, or a combination thereof to the tailgate system. The tailgate system may be structurally rigid to support the weight of heavy cargo during loading, transportation, unloading, or a combination thereof. All or a portion of the tailgate system may be made from or include: metals, such as aluminum or steel; plastic; a polymer; an overmolded material; a composite; a natural material; a synthetic material; an alloy; or a combination thereof. All or a portion of the tailgate system may be injection-molded, stamped, or cast. The tailgate system may have different components that are each made of different material. For example, the tailgate door may be made of metal and the bed extension may be made of a high-durability plastic. The tailgate system may vary in size and shape. For example, the tailgate system may be sized and shaped substantially similar to a standard tailgate designed for one or more original equipment manufacturers (OEMs). The tailgate system may include a tailgate door. The tailgate system may include a bed extension.

The tailgate system may include a tailgate door. The tailgate door may function to create a barrier for cargo stored in a transportation vehicle. The tailgate door may function to provide additional storage or workspace for a transportation vehicle. The tailgate door may function to provide access to the storage space of a transportation vehicle. The tailgate door may be secured along an outer perimeter of the storage space. The tailgate door may be removably attached to the storage space. The tailgate door may be pivotally engaged to the storage space to allow for opening and closing the tailgate door. The tailgate door may be pivotally engaged using one or more protrusions received by the storage space. The one or more protrusions may allow for pivotal rotation of the tailgate door relative to the storage space. For example, round protrusions on opposing sides of the tailgate door may extend into holes of the storage space to allow rotation of the protrusions within the holes, thereby allowing pivoting of the tailgate door relative to the storage space. The tailgate door may be locked to the storage space in a closed position using one or more locking mechanisms. The locking mechanisms may be a latch, hook, pin, shaft, key, any other locking mechanism used in the automotive industry, or a combination thereof.

The tailgate door may include a cavity for storing additional components. For example, one or more ramps of the tailgate system may be stored within the cavity. The cavity may vary in shape and size. The cavity may include a crossmember for additional structural rigidity and to ensure stored components remain intact during movement of the tailgate door. The tailgate door may vary in size and shape. For example, the tailgate door may be sized and shaped substantially similar to a standard tailgate designed for one or more original equipment manufacturers (OEMs). The tailgate door may include one or more components to aid in movement of the tailgate door (i.e., during opening and closing of the tailgate door relative to a vehicle bed). For example, the tailgate door may include a torsion rod to mitigate a portion of the weight of the tailgate door a user may feel during opening and closing of the tailgate door. The torsion rod may mitigate about 15% or more of the weight, about 30% or more of the weight, or about 45% or more of the weight of the tailgate door. The torsion rod may mitigate about 90% or less of the weight, about 75% or less of the weight, or about 60% or less of the weight of the tailgate door. The tailgate door may include one or more features incorporated into the standard tailgate designed for one or more OEMs. For example, the tailgate door may include a backup camera, a power locking actuator, an integrated tailgate step, a backup sensor, a power-assist tailgate actuator, or a combination thereof.

The tailgate door may include one or more bores. The bores may function to provide accessibility to one or more components of the tailgate system. The bores may function to decrease the weight of the tailgate door, increase durability, or both. The bores may function to allow debris, moisture, or both to drain from the tailgate door. The bores may allow a user access to one or more components of the tailgate system so that the one or more components of the tailgate system may be easily moved by the user. For example, a user may move a bed extension pivotally engaged to the tailgate door by grasping an end portion of the bed extension abutting one or more handle bores so that the bed extension may be pivoted away from the tailgate door. The bores may be any size and shape. The bores may be positioned anywhere along the tailgate door. The bores may abut one or more components abutting a surface of the tailgate door. The bores may extend through any desired thickness of the tailgate door. The bores may be positioned along or near an outer edge of the tailgate door. The bores may be a single bore. The bores may be a plurality of bores. The bores may abut a bed extension in a closed position.

The bed extension may function to provide additional storage or workspace for a transportation vehicle. The bed extension may function to secure oversized cargo during transportation. The bed extension may function to provide a partial walkway into the storage space. The bed extension may be pivotally engaged to the tailgate door. The bed extension may extend to one or more positions relative to the tailgate door. The bed extension may form a closed position with the tailgate door, whereby the bed extension and the tailgate door form an angle of about zero degrees. The bed extension may form one or more open positions with the tailgate door. The one or more open positions may include a semi-open position, whereby the bed extension and the tailgate door form an angle of about 180 degrees or more. The one or more open positions may include a fully-open position, whereby the bed extension and the tailgate door form an angle of about 210 degrees or more. The bed extension and the tailgate door may form any desired angle. The bed extension and the tailgate door may form an angle of about 45 degrees or more, about 90 degrees or more, about 135 degrees or more, or about 180 degrees or more. The bed extension and the tailgate door may form an angle of about 305 degrees or less, about 270 degrees or less, or about 225 degrees or less. The bed extension may be structurally rigid to support cargo being loaded and unloaded from the storage space. The bed extension may extend or retract relative to the tailgate door. For example, the bed extension may include one or more telescoping portions that extend and retract the bed extension relative to the tailgate door.

The bed extension may have any size and shape. The bed extension may have an area less than an area of the tailgate door. For example, a height and width of the bed extension may be less than a height and width of the tailgate door so that the bed extension is substantially or fully stored within the confines of the tailgate door in a closed position (i.e., an angle between the tailgate door and the bed extension is about zero degrees). Accordingly, the bed extension may be flush with a surface of the tailgate door in the closed position, semi-open position, or both.

The bed extension may be formed from one or more frame members. The frame members may function to form an outer periphery of the bed extension. The frame members may create an overall frame and/or shape of the bed extension. The frame members may connect to one another via one or more fasteners, one or more bonds, or both. For example, the frame members may be welded to one another to form the overall frame of the bed extension. Alternatively, the frame members may be monolithically (i.e., integrally) formed with one another. The frame members may form the overall dimensions (e.g., width and height) of the bed extension. The frame members may remain rigid relative to one another. Alternatively, the frame members may pivot or articulate relative to one another. The frame members may include one or more cutouts, one or more notches, one or more bumps, one or more undulations, one or more arcuate portions, one or more linear portions, one or more bends, one or more chamfers, one or more fillets, one or more gussets, one or more ribs, or a combination thereof. The frame members may include one or more slots configured to receive one or more secondary accessories, one or more ramps, or a both.

The frame members may include one or more hooks. The hooks may function to attach to one or more secondary components. The hooks may function to secure cargo within the storage area. For example, the hooks may secure one or more hooks of a tie-down strap that secures oversized cargo within the storage area. The hooks may be positioned anywhere along the frame members. The hooks may be positioned along an exterior or peripheral edge of the frame members. The hooks may be monolithically formed with the frame members. The hooks may be any size and shape to receive the one or more secondary components. The hooks may be structurally rigid to withstand a desired load when securing cargo within the storage area. A single hook may be located on a frame member or a plurality of hooks may be formed with a single frame member. The hooks may be positioned adjacent to one or more crossmembers.

The crossmembers may function to reinforce the bed extension. The crossmembers may function to form one or more cutouts within the confines of the frame members. The crossmembers may extend between one or more frame members. The crossmembers may project from one or more frame members. The crossmembers may be substantially planar with the frame members. The crossmembers may include one or more cutouts, one or more notches, one or more bumps, one or more undulations, one or more arcuate portions, one or more linear portions, one or more bends, one or more chamfers, one or more fillets, one or more gussets, one or more ribs, or a combination thereof. The crossmembers may be shaped substantially similar to the frame members or may be different. For example, the frame members may have a substantially square cross-section while the crossmembers have a substantially rectangular cross-section. The crossmembers may include one or more cutouts configured to receive one or more secondary accessories, one or more ramps, or a both. The slots may be and size and shape. The slots may be spaced apart any desired distance.

The slots may function to receive, secure, or both one or more secondary accessories, one or more ramps, or both. The slots may be any size and shape. The slots may be spaced apart any desired distance. The frame members may be secured to one or more crossmembers. The one or more secondary accessories, one or more ramps, or both may be secured to a single slot or a plurality of slots. The slots may be positioned anywhere along the frame members, the crossmembers, or both.

The crossmembers may interconnect each other, one or more frame members, or both to form one or more cutouts. The cutouts may function to receive one or more panels of the bed extension. The cutouts may be formed from one or more frame members, one or more crossmembers, or both. The cutouts may be any size and shape. The cutouts may be shaped substantially similar to a shape of the panels so that the panels abut one or more outer edges of the cutout. For example, the cutout may be substantially rectangular and receive a substantially rectangular panel having similar dimensions. The cutouts may extend through a thickness of the bed extension. The cutouts may extend through a portion of thickness of the bed extension so that the cutouts form a cavity. The cutouts may receive one or more secondary attachments other than a panel. For example, the cutouts may receive a secondary step that attaches within the cutout. The secondary step may include one or more hinges secured within the cutout so that, during use, the secondary step extends out of the cutout and away from the bed extension to provide a platform for a user. When the secondary step is not in use, the secondary step may be stored within the confines of the cutout and may be substantially flush with one or more surfaces of the bed extension. Mounts may be positioned at or near the connection points between the crossmembers, the one or more frame members, or both within the confines of the cutouts.

The mounts may function to secure one or more panels of the bed extension. The mounts may function to support the panels of the bed extension. The mounts may be positioned anywhere along the frame members, the crossmembers, or both within the cutouts. The mounts may be monolithically formed with the frame members, the crossmembers, or both. The mounts may be secured to the frame members, the crossmembers, or both using one or more adhesives, one or more fasteners, or both. The mounts may include one or more receiving portions to receive one or more panels. The one or more receiving portions may be a groove, step, channel, flange, lip, other mating portion, or a combination thereof. The mounts may include one or more holes that mate, or align with, one or more holes of the panels so that one or more fasteners may secure the panels to the mounts via the aligned holes. The mounts may be any size and shape. The mounts may be recessed from one or more surfaces of the bed extension so that, when the panels are secured to the mounts, the panels are substantially flush with the one or more surfaces of the bed extension. The mounts may abut a portion of the panels. The mounts may abut one or more peripheral edges of the panels. The mounts may abut one or more corners of the panels.

The panels may function to provide structural support to the bed extension. The panels may function to provide a securing means to one or more pieces of cargo in the storage area. The panels may function to provide a work surface of the tailgate system. The panels may function to provide a partial ramp to reach the storage area. The panels may be interchangeable. The panels may be removable. The panels may include one or more abrasive surfaces, one or more smooth surfaces, or both. For example, the panels may include a first surface having a plurality of raised ribs to increase friction and an opposing second surface being substantially smooth to create a workspace. The panels may be formed of a material similar to the bed extension. The panels may be aluminum, steel, iron, tin, or a combination thereof. The panels may be plastic. The panels may be extruded, pultruded, injection molded, stamped, die cut, cast, or a combination thereof. The panels may be solid. The panels may be hollow. The panels may include one or more strengthening features, such as ribs, gussets, crossmembers, walls, or a combination thereof.

The panels may be secured to the bed extension in any desired way. The panels may be pivotally engaged to the bed extension. For example, the panels may be secured to the bed extension via one or more hinges so that the panels may be opened and closed relative to the bed extension. Alternatively, a plurality of fasteners may secure the panels to the bed extension.

The panels may include a slot. The slot may function to receive one or more secondary components. For example, the slot may function to receive a tie-down strap or securing mechanism to secure one or more pieces of cargo in the storage area. The slot may extend along a portion of the panel. The slot may be positioned anywhere along the panel. The slot my be located on one or more surfaces of the panel. The slot may form a hollow void to receive a portion of one or more accessories. The slot may be any desired size and shape. The slot sizes, shapes, positions, or a combination thereof may vary between panels to provide increased customization of the bed extension.

The panels may include one or more holes. The one or more holes may function to secure the panels to the mounts, frame members, crossmembers, or a combination thereof. The one or more holes may be positioned anywhere along the panels. The one or more holes may be any desired size and shape. The one or more holes may extend through a thickness of panels so that one or more fasteners (e.g., a bolt) may extend through the panel and secure the panel to a hole of the mounts. The one or more holes may be positioned along one or more flanges of the panels.

The flanges may function to abut the mounts, frame members, crossmembers, or a combination thereof to secure the panels to the bed extension. The flanges may be located along an outer periphery of the panels. The flanges may extend and/or project from one or more peripheral edges of the panels. The flanges may extend along all or a portion of one or more edges of the panels. The flanges may have a thickness greater than, less than, or substantially equal to the overall thickness of the panels. The flanges may include the one or more holes. One or more surfaces of the flanges may abut the mounts so that a surface of the panels is substantially coplanar with a surface of the bed extension.

One or more channels may be positioned between the flanges. The channels may function to receive one or more secondary components of the tailgate system. The secondary components may be a strap, hook, tool, hanger, support rod, bar, or a combination thereof. The channels may have any desired cross-section. The channels may have a cross-section that is substantially square, rectangular, T-shaped, U-shaped, V-shaped, C-shaped, G-shaped, or a combination thereof. The channels may extend between opposing edges of the panels. The channels may be positioned anywhere along the panels. The channels may extend through a portion of the thickness of the panels. The channels may include one or more openings to receive the secondary components. The openings may have a rounded edge to receive the secondary components.

The bed extension may further include one or more lug portions. The lug portions may function to secure the bed extension to the tailgate door. The lug portions of the bed extension may be received by, and secured to, one or more portions of the tailgate door using one or more fasteners. The one or more fasteners may be a bolt, screw, pin, lug, rivet, latch, hook, stud, or a combination thereof. The one or more fasteners may be accompanied by one or more washers, nuts, or both. The lug portions may be monolithically formed with the bed extension. For example, the lug portions may extend from the frame members, crossmembers, or both to attach to the tailgate door. The lug portions may include one or more holes to receive the one or more fasteners. The lug portions may be locally reinforced relative to the frame members, crossmembers, or both. For example, the lug portions may have a localized thickness greater than the frame members, crossmembers, or both to ensure that the lug portions remain structurally rigid during articulation of the bed extension relative to the tailgate door.

The lug portions may be secured to one or more bosses of the tailgate door. The bosses may function to receive the lug portions and pivotally secure the lug portions so that the bed extension may pivot relative to the tailgate door. The bosses may be monolithically formed with the tailgate door. For example, the one or more bosses may be recessed from a surface of the tailgate door so that, when the bed extension is in a closed position (i.e., the bed extension abuts the tailgate door), the bed extension, the one or more bosses, or both are substantially flush with the surface of the tailgate door. The bosses may include one or more projections that receive the lug portions of the bed extension. The projections may have a gap between the projections the receives the lug portions (i.e., a width of the gap is greater than a width of the lug portions). The bosses may include one or more ears, one or more fingers, one or more arms, or a combination thereof. The bosses may be rounded, substantially flat, or a combination thereof. The bosses may include one or more holes that align with one or more holes of the lug portions so that one or more fasteners may extend through the aligned holes. Accordingly, the bosses may engage the lug portions so that the bed extension pivotally moves relative to the tailgate door into a fully-open position, whereby the lug portions are received by one or more notches of the tailgate door.

The one or more notches may function to receive one or more lug portions of the bed extension to allow for further rotational range. The notches may be shaped substantially similar to the one or more lug portions, may be oversized to ensure that the one or more lug portions are received by the notches during pivoting, or both. The notches may be monolithically formed with the tailgate door. The notches may be recessed from one or more surfaces of the tailgate door. For example, the notches may be recessed so that the bed extension pivots relative to the tailgate door free of a pivot point protruding from a surface of the tailgate door (i.e., the one or more bosses are recessed from a surface of the tailgate door).

The notches may allow for the bed extension to move to a plurality of positions relative to the tailgate door. For example, when the tailgate door is in an open position, the bed extension may be positioned: in a closed position approximately 0 degrees from a top surface of the tailgate door; in an upright position approximately 90 degrees from the top surface of the tailgate door; in a semi-open position approximately 180 degrees from the top surface of the tailgate door; in a fully-open position approximately 210 degrees from the top surface of the tailgate door; or a combination thereof. Each position may provide different functionality. For example, when the bed extension is in an upright position, the bed extension may function to secure oversized cargo during transportation. However, when the bed extension is in a fully-open position, the bed extension may provide a partial walkway into the storage space to load and unload cargo. The bed extension may be maintained in a desired position using one or more blocks positioned beneath the one or more lug portions of the bed extension.

The one or more blocks may function to support the bed extension. The one or more blocks may support the one or more lug portions of the bed extension or any other portion of the bed extension. For example, the blocks may be positioned directly beneath the lug portions of the bed extension so that the lug portions rest on the blocks, or the blocks may be positioned underneath a peripheral edge of the bed extension to maintain the position of the bed extension. The one or more blocks may vary in size and shape to maintain a desired position. For example, the blocks may be shaped so that a surface of the blocks are substantially flush with a surface of the tailgate door so that, when the bed extension rests on the blocks, the bed extension maintains a semi-open position relative to the tailgate door (i.e., about 180 degrees from the top surface of the tailgate door). However, the blocks may be shaped at any dimensions to maintain a desired angle of the bed extension to the tailgate door (i.e., greater than about 180 degrees, less than about 180 degrees, or both). The notches of the tailgate door may be integrally formed with a portion of the blocks. For example, the blocks may include a cutout that forms the notch so that, when the blocks are in a disengaged position, only the notches are exposed within windows of the channel. The blocks may be made of any material that supports the weight of the bed extension, additional cargo, users, or a combination thereof. The blocks may be made of a material that is substantially similar to the material of the bed extension, the tailgate door, or both.

The blocks may be interconnected via one or more rods extending between the blocks. The rods may function to move the blocks simultaneously between an engaged position and a disengaged position. For example, the blocks may be daisy-chained in a substantially linear manner by a plurality of rods extending between opposing ends of each block so that, when a handle connected to the blocks is moved, the blocks move simultaneously in the desired direction. The rods may interconnect all of the blocks or only a portion of the blocks. For example, a first set of rods may interconnect approximately 50% of the blocks while a second set of rods may interconnect approximately 50% of the blocks so that each set of rods may be moved simultaneously together, in opposing directions to one another, or both. The rods may be shaped similar to the blocks or may be dissimilar. For example, the rods may have a diameter less than the blocks. The rods may be substantially cylindrical or may be a shape other than cylindrical. The rods may be monolithically formed with the blocks or may be connected to the blocks by adhesives, mechanical fasteners, or both. The rods may be threaded to screw into a mating thread of one or more holes in the blocks. The rods may be structurally rigid or compressible. The rods may move the blocks through a sleeve of the tailgate door.

The sleeve may function to house the blocks when in a disengaged position. The sleeve may function to guide the blocks during movement. For example, the blocks may be positioned within the sleeve in a disengaged position (i.e., when the blocks are not located beneath the lug portions of the bed extension so that the lug portions may extend into the notches and reach the fully-open position) so that, when a handle is moved, the blocks move out of the sleeve into an engaged position substantially within the notches so that the lug portions of the bed extension rest on the blocks to maintain a semi-open position. The sleeve may be shaped substantially similar to the blocks or more be dissimilar. The sleeve may be U-shaped, V-shaped, D-shaped, G-shaped, circular, or a combination thereof. The sleeve may be substantially hollow to allow the blocks to move through the sleeve. The sleeve may be integrally formed with the tailgate door or may be connected to the tailgate door via a secondary assembly operation. The sleeve may be located along a peripheral edge of the tailgate door near the notches of the tailgate door. The sleeve may extend substantially along an entire edge of the tailgate door (i.e., substantially along an entire length of the tailgate door, width of the tailgate door, or both). The sleeve may include one or more tracks within the sleeve.

The track may function to guide a handle connected to the rods, blocks, or both. For example, the track may guide a handle directly or indirectly connected to the blocks so that, when the handle is moved along the track, the blocks are moved between an engaged position and a disengaged position. The tracks may be shaped substantially similar to a handle or may be different. The tracks may be stamped directly into the sleeve. The tracks may be cut out of the sleeve using laser cutting, scoring, water cutting, or a combination thereof. The track may include terminating ends to prevent the handle from moving past one or more desired positions. The track may define a distance the blocks travel by determining a correlated distance of travel of the handle within the track. For example, the slot may allow for approximately 20 cm of travel of the handle, which results in approximately 20 cm of travel of the blocks. The handle may travel about 10 cm or more, about 20 cm or more, or about 30 cm or more within the track. The handle may travel about 60 cm or less, about 50 cm or less, or about 40 cm or less within the track. The tracks may be integrally formed with the sleeve. For example, the sleeve may include a track that guides a handle connected to the blocks to move the blocks between the engaged and disengaged positions. The engaged position may be defined as a position where the blocks are exposed so that the lug portions of the bed extension rest on the blocks, thereby maintaining a semi-open position of the bed extension. The disengaged position may be defined as a position where the notches are exposed so that the lug portions of the bed extension are received by the notches, thereby allowing the bed extension to extend to a fully-open position.

The handle may function to directly or indirectly attach to the blocks, rods, or both so that a user may manually move the blocks between an engaged position and a disengaged position. The handle may extend through a slot of the sleeve and connect to the rods, blocks, or both. The handle may move within the slot to adjust the position of the blocks. The handle may be a level, grip, knob, arm, pin, rope, hook, or a combination thereof. The handle may allow a user to move the blocks from an engaged position to a disengaged position so that the lug portions of the bed extension rest within the notches of the tailgate door in a fully-open position, free of obstruction of from the blocks. When in the open position, one or more ramps may be connected to one or more slots of the bed extension.

The one or more slots may function as an attachment point for one or more ramps, one or more accessories, or both. The slots may function to provide access to a handle for a user to adjust the position of the bed extension, one or more panels of the bed extension, or both. The slots may be positioned along a peripheral edge of the bed extension. For example, the slots may be located along the frame members, the crossmembers, or both. The slots may be positioned away from one or more peripheral edges of the bed extension (i.e., near a center area of the bed extension). The slots may be rectangular, oval, square, triangular, round, trapezoidal, or a combination thereof. A plurality of slots may be uniform in shape or may vary. The slots may include a rounded edge to provide users a smooth surface to grab. The slots may be integrally formed with the bed extension, the one or more panels, or both. For example, the slots may be stamped out of the material of the bed extension, the one or more panels, or both. The slots may include a friction material to increase friction between the one or more ramps, the one or more accessories, or both. For example, the slots may be coated with a rubber and/or silicone material to increase friction.

The tailgate system may include one or more ramps. The one or more ramps may function to provide access to the storage area from the ground. The one or more ramps may function to allow for loading and unloading of oversized or heavy cargo that is difficult to lift, but can be slid or rolled up the one or more ramps directly into the storage area. The one or more ramps may be removably attached to the bed extension to provide users a complete ramp system for access to the storage area. For example, one or more engaging features along a proximal end of the one or more ramps may attach to the one or more slots of the bed extension when the bed extension is in a fully-open position. The engaging feature may be a hook mechanism, slot, clip, connector, press-fit, thread, or a combination thereof. The one or more ramps may be structurally rigid to support the weight of oversized or heavy cargo. The one or more ramps may be stored within the cavity of the tailgate door when not in use. When stored, the one or more ramps may be covered by the bed extension, the tailgate door, or both to protect the one or more ramps from debris, moisture, other environmental elements, or a combination thereof.

In addition to the ramps, one or more accessories may be secured to the bed extension. The accessories may be secured to the bed extension in the fully-open position, semi-open position, closed position, or a combination thereof. The accessories may be secured to the bed extension using one or more engaging features similar to the ramps. The accessories may be secured to the bed extension using one or more engaging features dissimilar to the engaging features of the ramps. For example, the accessories may be secured to the bed extension using clips, hooks, latches, hook-and-loop attachments, pins, keys, adhesives, or a combination thereof. The accessories may be any secondary attachment. For example, the accessories may include: a grill, a toolbox and/or individual tools (e.g., a drill, hammer, saw, wrench, screwdriver, wire cutters, etc., or a combination thereof), steps, a cargo pod and/or storage basket, an additional bed extension, table, seat, bike rack, motorized lift, air compressor, generator, work light, cooler, or a combination thereof. For example, a secondary table may be secured to one or more slots along the frame members, crossmembers, or both to provide a work station of the tailgate system. The table may extend from the bed extension during use and collapse when not in use. The accessories may be removably attached to the bed extension so that the accessories may be stored in the storage area of the vehicle, the cabin of the vehicle, or both. When secured to the bed extension, the accessories may be mounted on a surface of the bed extension, extend from one or more peripheral edges of the bed extension, hang from the bed extension, or a combination thereof.

Turning now to the figures, FIG. 1 illustrates a perspective view of a bed extension 30 of a tailgate system. The bed extension 30 includes a plurality of frame members 44 that form an outer peripheral of the bed extension 30. The frame members 44 may include one or more slots 40 configured to receive one or more accessories, one or more ramps, or a combination thereof (see FIG. 7). A plurality of crossmembers 46 extend between, or project from, the frame members 44 to form a plurality of cutouts 36 within the confines of the bed extension 30. A plurality of mounts 38 are positioned near intersections between the frame members 44 and the crossmembers 46, between the frame members 44, between the crossmembers 46, or a combination thereof. The mounts 38 may be configured to secure one or more panels within the cutouts 36 of the bed extension 30 (see FIG. 2B). The frame members 44, the crossmembers 46, or both may include a lug portion 34 extending from a distal end. The lug portions 34 may include a hole 42 configured to receive one or more fasteners to secure the bed extension 30 to a tailgate door (see FIG. 3).

Figure 2A:
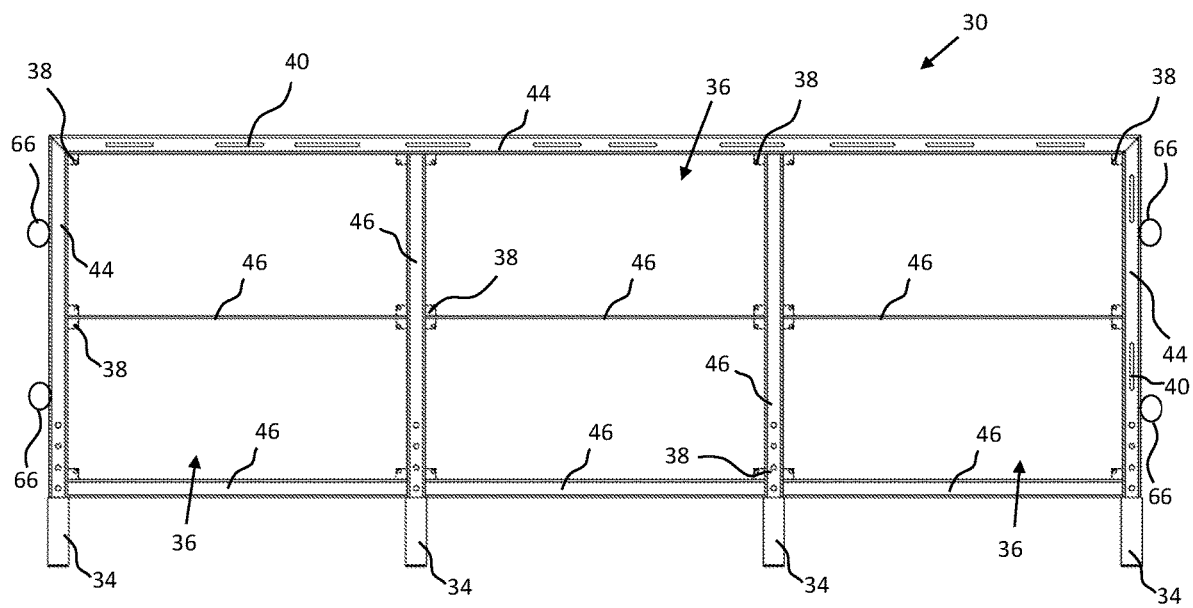
FIG. 2A is a front view of a bed extension free of panels.
Figure 2B:
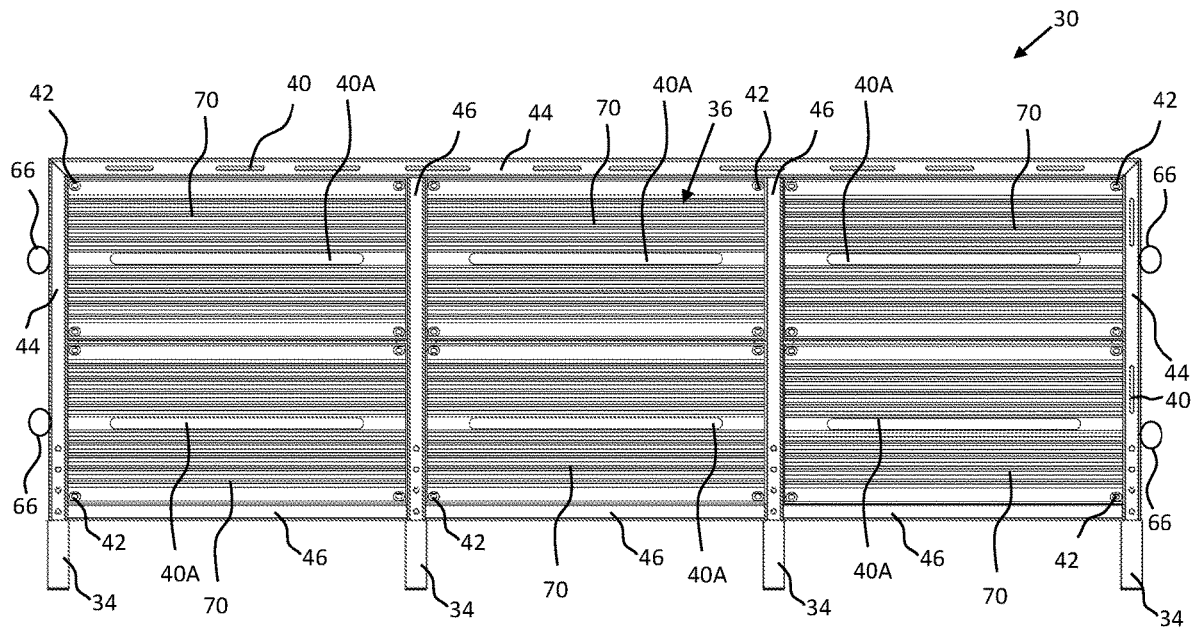
FIG. 2B is a front view of the bed extension of FIG. 2A including a plurality of panels.

FIGS. 2A and 2B illustrate a front view of a bed extension 30. The bed extension 30 includes a plurality of frame members 44 that form an outer peripheral of the bed extension 30. The frame members 44 may include one or more slots 40 configured to receive one or more accessories, one or more ramps, or a combination thereof (see FIG. 7). The frame members 44 may further include one or more hooks 66 to receive one or more secondary accessories, fastening mechanisms, or both. A plurality of crossmembers 46 extend between, or project from, the frame members 44 to form a plurality of cutouts 36 within the confines of the bed extension 30. A plurality of mounts 38 are positioned near intersections between the frame members 44 and the crossmembers 46, between the frame members 44, between the crossmembers 46, or a combination thereof. The mounts 38 are configured to secure one or more panels 70 having a panel slot 40A within the cutouts 36 of the bed extension 30. The panels 70 may be secured to the mounts 38 by aligning holes 42 of the panels 70 with associated holes of the mounts 38 so that fasteners may extend through the aligned holes 42 of the panels 70 and the mounts 38. The frame members 44, the crossmembers 46, or both may include a lug portion 34 extending from a distal end.

Figure 3:
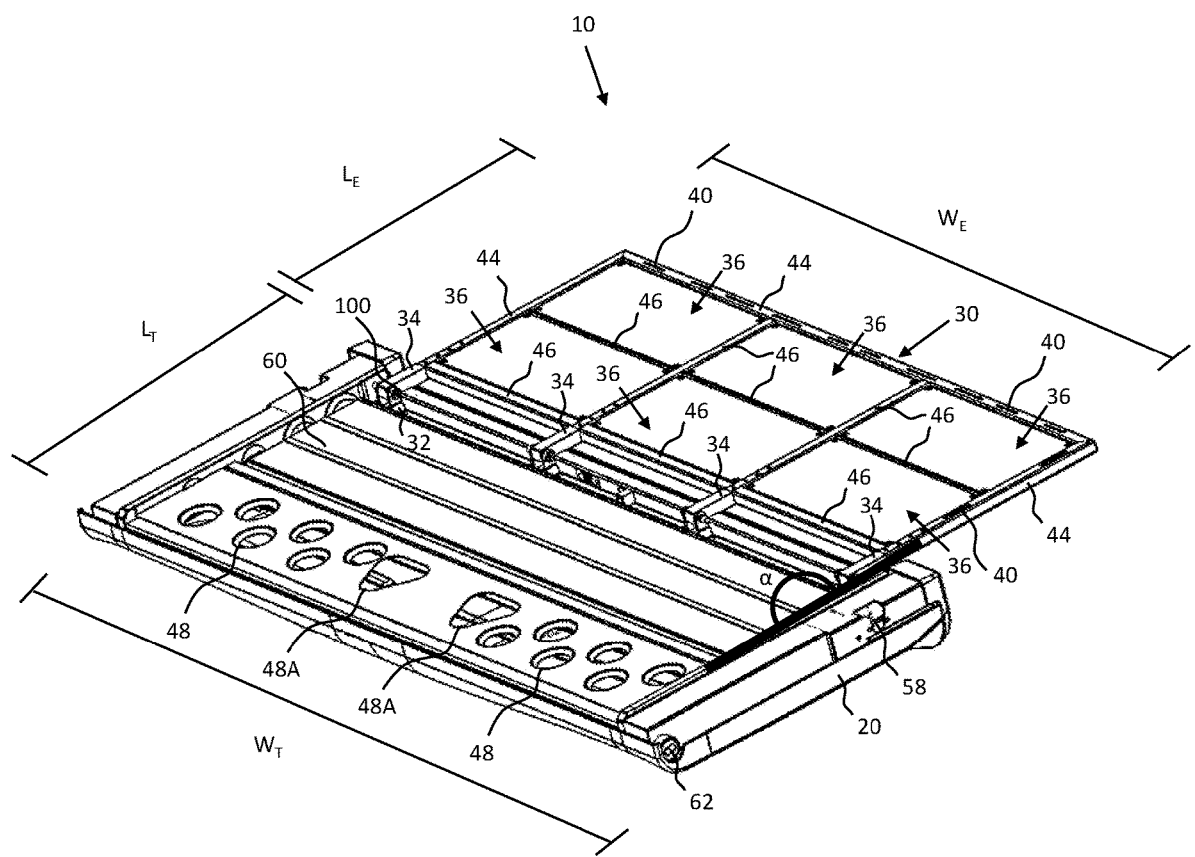
FIG. 3 is a perspective view of a tailgate system in a semi-open position.

FIG. 3 illustrates a perspective view of a tailgate system 10 in a semi-open position. The tailgate system 10 includes a tailgate door 20. The tailgate door 20 includes a locking mechanism 58 and a protrusion 62 on opposing sides to secure the tailgate door 20 to a bed of a vehicle (not shown). The tailgate door 20 further includes a plurality of bores 48 along an inner surface of the tailgate door 20. One or more of the bores may be a handle bore 48A to allow a user to grasp and extend a bed extension 30 to a desired position. As shown, the bed extension 30 is extended to form an angle ($\alpha$) of approximately 180 degrees relative to an inner surface of the tailgate door 20. It should be noted that the angle ($\alpha$) formed between the bed extension 30 and the tailgate door 20 may be anywhere from about 0 degrees (i.e., a closed position) to about 210 degrees (i.e., a fully-open position). The bed extension 30 includes a plurality of frame members 44 that form an outer peripheral of the bed extension 30. The frame members 44 may include one or more slots 40 configured to receive one or more accessories, one or more ramps 60 stored within the confines of the tailgate door 20, or a combination thereof (see FIG. 7). A plurality of crossmembers 46 extend between, or project from, the frame members 44 to form a plurality of cutouts 36 within the confines of the bed extension 30. The cutouts 36 are configured to receive one or more panels of the bed extension 30 (see FIGS. 2A and 2B). The frame members 44, the crossmembers 46, or both may include a lug portion 34 extending from a distal end. Bosses 32 projecting from the tailgate door 20 receive the lug portions 34 to rotatably secure the bed extension 30 to the tailgate door 20 via a plurality of fasteners 100. A plurality of blocks abut the lug portions 34 of the bed extension 30 to secure the bed extension 30 in the semi-open position (see FIG. 5). As illustrated, a length ($L_E$) and width ($W_E$) of the bed extension 30 may be less than a length ($L_T$) and width ($W_T$) of the tailgate door 20 so that the bed extension 30 may be substantially stored within the confines of the tailgate door 20 in a closed position (i.e., an angle ($\alpha$) between the tailgate door 20 and the bed extension 30 is approximately 0 degrees).

Figure 4:
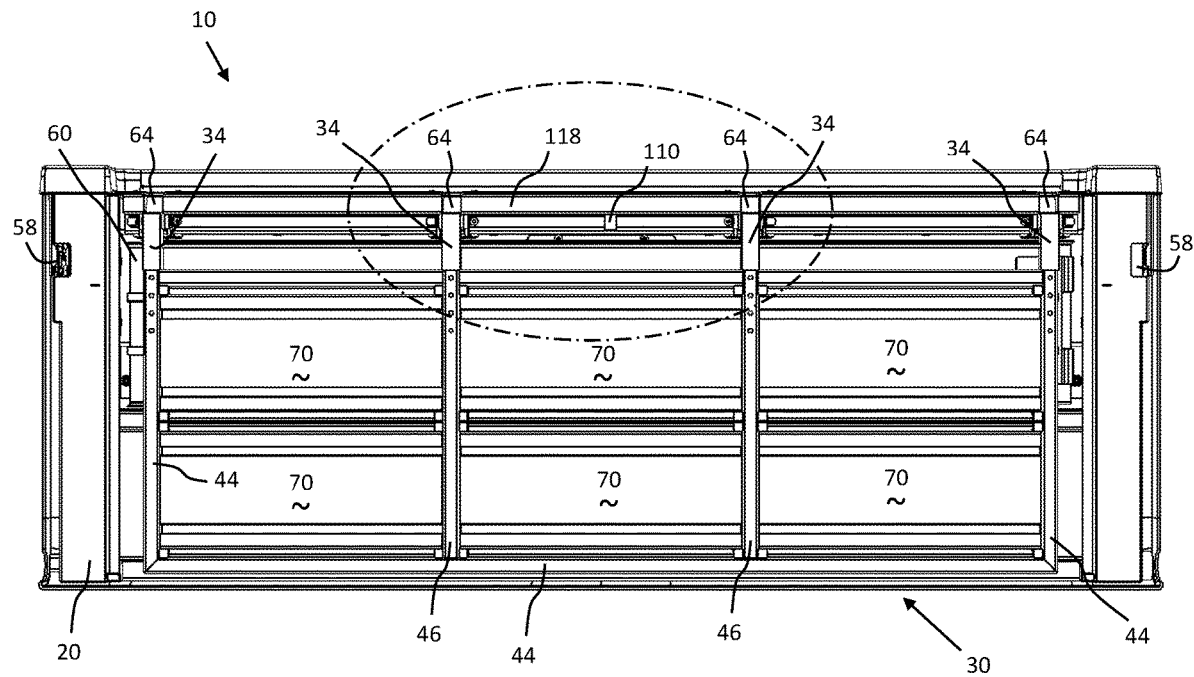
FIG. 4 is a front view of a tailgate system in a closed position.

FIG. 4 illustrates a front view of a tailgate system 10 in a closed position. The tailgate system 10 includes a tailgate door 20. The tailgate door 20 includes a locking mechanism 58 on opposing sides to secure the tailgate door 20 to a bed of a vehicle (not shown). A bed extension 30 is pivotally secured to the tailgate door 20 via a plurality of lug portions 34. The bed extension 30 includes a plurality of frame members 44 that form an outer peripheral of the bed extension 30. The frame members 44 may include one or more slots configured to receive one or more accessories, one or more ramps 60 stored within the confines of the tailgate door 20, or a combination thereof (see FIG. 7). A plurality of crossmembers 46 extend between, or project from, the frame members 44 to form a plurality of cutouts within the confines of the bed extension 30 (see FIG. 2A). The cutouts are configured to receive one or more panels 70 of the bed extension 30. The frame members 44, the crossmembers 46, or both may include the lug portions 34 extending from a distal end. The tailgate door 20 further includes a handle 110 slidably engaged to a track to move a plurality of blocks within a sleeve 118 of the tailgate door 20 between an engaged position and a disengaged position (see FIG. 5). The lug portions 34 of the bed extension 30 are pivotally engaged with the tailgate door 20 so that, when the bed extension 30 pivots in relation to the tailgate door 20, the lug portions 34 of the bed extension may be received by a plurality of notches 64 in the tailgate door 20, thereby allowing the bed extension 30 to pivot to a fully-open position (see FIG. 7). Alternatively, when the plurality of blocks are in the engaged position, the plurality of blocks are located within the notches 64 so that the lug portions 34 rest on the plurality of blocks and maintain a semi-open position of the tailgate system 10 (see FIG. 3).

Figure 5:
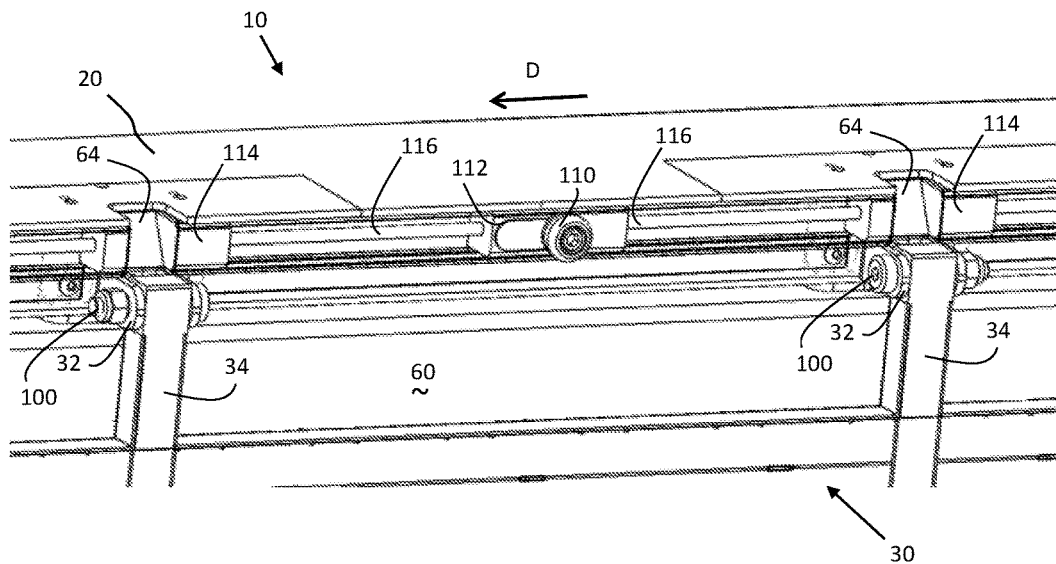
FIG. 5 is a close-up view of the tailgate system of FIG. 4.

FIG. 5 illustrates a close-up perspective view of the tailgate system 10 of FIG. 4. The tailgate system 10 includes a tailgate door 20. The tailgate door 20 includes a handle 110 slidably engaged to a track 112 to move a plurality of blocks 114 within a channel (not shown; see FIG. 4) of the tailgate door 20 between an engaged position and a disengaged position. Lug portions 34 of a bed extension 30 are pivotally engaged with bosses 32 of the tailgate door 20 and secured with fasteners 100. When the bed extension 30 pivots in relation to the tailgate door 20, the lug portions 34 of the bed extension are received by a plurality of notches 64 in the tailgate door 20, thereby allowing the bed extension 30 to pivot to a fully-open position (see FIG. 7). Alternatively, when the handle 110 is moved in a direction (D), the plurality of blocks 114 interconnected by rods 116 are moved to the engaged position, whereby the plurality of blocks 114 are positioned within the notches 64 so that the lug portions 34 rest on the plurality of blocks 114 and maintain a semi-open position of the tailgate system 10 (see FIG. 3). Additionally, as illustrated, ramps 60 are stowed within the tailgate door 20.

Figure 6:
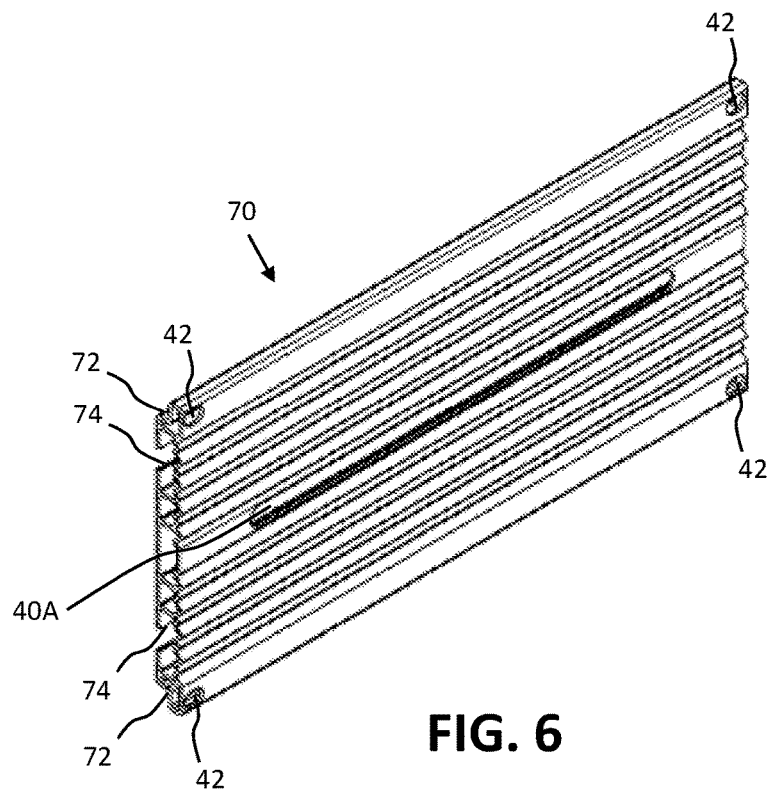
FIG. 6 is a perspective view of a panel.

FIG. 6 illustrates a perspective view of a panel 70. The panel 70 is configured to be received by, and secured in, one or more cutouts of a bed extension (see FIGS. 2A and 2B). The panel 70 includes a plurality of holes 42 configured to align with holes located on mounts of the bed extension to secure the panel 70 to the bed extension via one or more fasteners. The panel 70 further includes a panel slot 40A disposed on a surface of the panel 70. Additionally, the panel 70 includes a plurality of channels 74 positioned between opposing flanges 72, whereby the flanges 72 may be configured to abut the mounts of the bed extension to secure the panel 70 to the bed extension.

Figure 7:
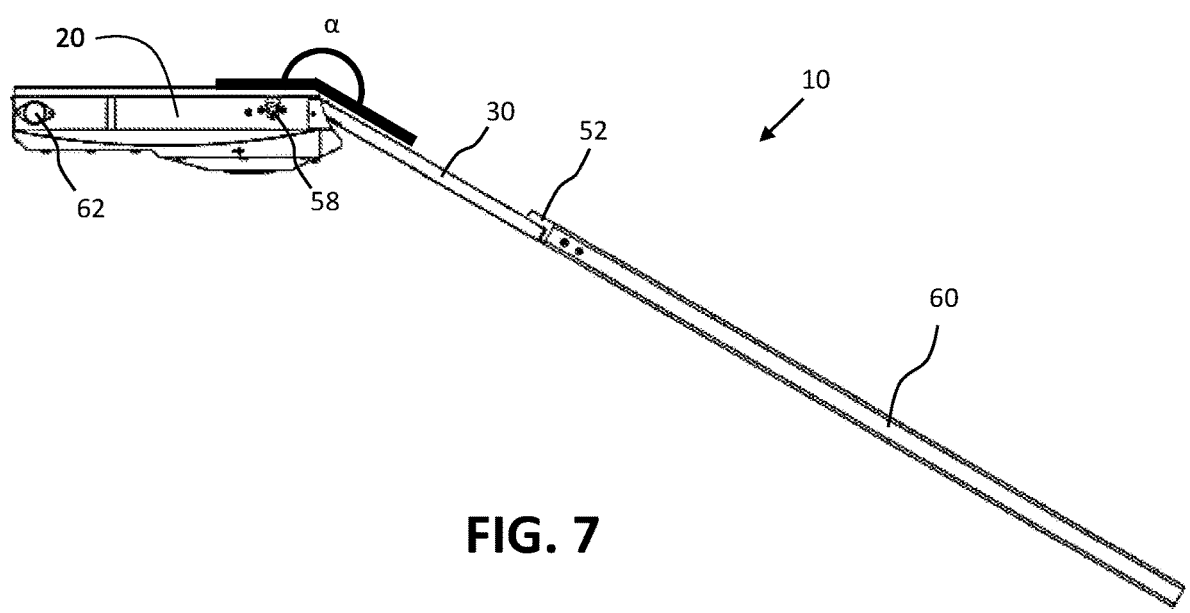
FIG. 7 is a side view of a tailgate system in a fully-open position.

FIG. 7 illustrates a side view of a tailgate system 10 in a fully-open position. The tailgate system 10 includes a tailgate door 20 having one or more locking mechanisms 58 and one or more protrusions 62 on an exterior side for securing the tailgate door 20 to a bed of a vehicle (not shown). A bed extension 30 is pivotally engaged to the tailgate door 20 to form an angle (a) of about 210 degrees with the tailgate door 20 in the fully-open position. It should be noted that the angle (a) formed between the bed extension 30 and the tailgate door 20 may be anywhere from about 0 degrees (i.e., a closed position) to about 210 degrees (i.e., a fully-open position). As illustrated, one or more ramps 60 are removably attached to the bed extension 30 by one or more engaging features 52 secured to slots of the bed extension 30 (see FIG. 2).

ELEMENT LIST

10 Tailgate System
20 Tailgate Door
30 Bed Extension
32 Boss
34 Lug Portion
36 Cutout
38 Mount
40 Slot
40A Panel Slot
42 Hole
44 Frame Member
46 Crossmember
48 Bore
48A Handle Bore
52 Engaging Feature
58 Locking Mechanism
60 Ramp
62 Protrusion
64 Notch
66 Hook
70 Panel
72 Flange
74 Channel
100 Fastener
110 Handle
112 Track
114 Block
116 Rod
118 Sleeve
α Angle (Bed Extension relative to the Tailgate Door)
D Direction of Movement (of the Handle)
$L_E$ Length (of the Bed Extension)
$W_E$ Width (of the Bed Extension)
$L_T$ Length (of the Tailgate Door)
$W_T$ Width (of the Tailgate Door)

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:
1. A tailgate system, comprising:
  a. a tailgate door configured to pivotally engage a rear cargo area of a body of a vehicle in between a closed position and an open position; and
  b. a bed extension pivotally engaged to the tailgate door and configured to pivot from a closed position to one or more open positions, the bed extension comprising:
    i. a removeable panel;
    ii. one ore more frame members that form an outer periphery of the bed extension;
    iii. one or more crossmembers extending between, or projecting from, the one or more frame members to form a cutout; and
    iv. a mount positioned within the cutout, wherein the panel includes a flange that abuts the mount so that a hole of the panel aligns with a hole of the mount and a fastener extends through the hole of the panel and the hole of the mount to secure the panel to the bed extension.

2. The tailgate system according to claim 1, wherein the bed extension is pivotally engaged to the tailgate door via a lug portion extending from the one or more frame members, one or more crossmembers, or both.

3. The tailgate system according to claim 1, wherein the one or more open positions includes a semi-open position that forms an angle of about 180 degrees between the bed extension and an inner surface of the tailgate door.

4. The tailgate system according to claim 1, wherein the one or more open positions includes a fully-open position that forms an angle of about 210 degrees between the bed extension and an inner surface of the tailgate door.

5. The tailgate system according to claim 4, wherein a lug portion is received by a notch of the tailgate door to extend to the fully-open position.

6. The tailgate system according to claim 1, wherein the panel includes a slot on a first surface and a channel on an opposing second surface.

7. The tailgate system according to claim 1, wherein the panel is interchangeable with one or more additional panels.

8. The tailgate system according to claim 1, wherein the panel is extruded aluminum.

9. The tailgate system according to claim 4, wherein the bed extension includes one or more slots configured to secure one or more ramps, and the one or more ramps are stored within the confines of the tailgate door when not secured to the bed extension.

10. The tailgate system according to claim 9, wherein the one or more ramps are secured to the bed extension in the fully-open position.

11. The tailgate system according to claim 1, wherein when the bed extension is in the closed position, the bed extension abuts an inner surface of the tailgate door, and the inner surface of the tailgate door includes a bore that allow a user to grasp the bed extension to move the bed extension to the one or more open positions.

12. The tailgate system according to claim 11, wherein an area of the bed extension is less than an area of the tailgate door so that the bed extension is stored within the confines of the tailgate door in the closed position.

13. The tailgate system according to claim 2, wherein the lug portion of the bed extension is received by a boss of the tailgate door, and the lug portion is pivotally engaged to the boss via fasteners.

14. The tailgate system according to claim 3, wherein the tailgate door further includes a block movably secured within a sleeve so that the block can be moved between an engaged position and a disengaged position, and when the block is in an engaged position, a lug portions of the bed extension rests on the block to maintain the bed extension in the semi-open position.

15. A bed extension configured to pivotally engage a tailgate door, the bed extension comprising:
   (i) one or more frame members that form an outer periphery of the bed extension;
   (ii) one or more crossmembers that extend between, or project from, the one or more frame members to form a cutout; and
   (iii) a panel secured within the cutout via a mount positioned within the cutout and secured to the one or more frame members, one or more crossmembers, or both, wherein the panel includes a flange that abuts the mount.

16. The bed extension according to claim 15, wherein the panel is secured to the mount by a fastener extending trough the flange into the mount.

17. The bed extension according to claim 15, wherein the one or more frame members, the one or more crossmembers, or both include a slot configured to secure removable ramps.

18. The tailgate system according to claim 1, wherein the bed extension includes six panels secured in six cutouts.

* * * * *